US005406632A

United States Patent [19]

Sogo et al.

[11] Patent Number: 5,406,632

[45] Date of Patent: Apr. 11, 1995

[54] METHOD AND DEVICE FOR CORRECTING AN ERROR IN HIGH EFFICIENCY CODED DIGITAL DATA

[75] Inventors: Akira Sogo; Akitoshi Saito, both of Hamamatsu, Japan

[73] Assignee: Yamaha Corporation, Hamamatsu, Japan

[21] Appl. No.: 93,275

[22] Filed: Jul. 16, 1993

[30] Foreign Application Priority Data

Jul. 16, 1992 [JP] Japan .................................. 4-211980

[51] Int. Cl.[6] .......................... G10L 3/00; G06F 11/00

[52] U.S. Cl. .......................................... 371/46; 371/31

[58] Field of Search ........................ 371/31, 38.1, 39.1, 371/40.1, 2.1, 43, 44, 45; 381/46, 36, 31

[56] References Cited

U.S. PATENT DOCUMENTS 5,148,487 9/1992 Nagai et al. ............................ 371/31

*Primary Examiner*—Roy N. Envall, Jr.
*Assistant Examiner*—Emmanuel Moise
*Attorney, Agent, or Firm*—Spensley Horn Jubas & Lubitz

[57] ABSTRACT

A method and device for correcting an error in digital data in which data of one frame consists of bit assignment data and plural data each consisting of a bit number assigned by the bit assignment data comprises a step of substituting the plural data by noise data when an error has occurred in the bit assignment data. In one aspect of the invention, a method for correcting an error in digital data in which data of one frame consists of bit assignment data and plural data each consisting of exponential data assigned by the bit assignment data and mantissa data of a number of bits assigned by the bit assignment data, comprising a step of correcting the exponential data on the basis of a preceding frame or on the basis of both preceding and subsequent frame and substituting the mantissa data by noise data when an error has occurred in the bit assignment data. The noise data may be band-limited noise. When an irremediable error has occurred in digital data, generation of an extreme noise is prevented and deterioration of a reproduced tone is thereby prevented.

16 Claims, 4 Drawing Sheets

METHOD AND DEVICE FOR CORRECTING AN ERROR IN HIGH EFFICIENCY CODED DIGITAL DATA

BACKGROUND OF THE INVENTION

This invention relates to a method and device for correcting an error in high efficiency coded digital data such as data used in a Digital Compact Cassette (DCC) system and a Mini Disc (MD) system and, more particularly to a method for correcting an error in digital data in a case where data of one frame is totally irremediable when an error has occurred.

In the DCC and MD systems, no data of digital audio signals, which are sampled at a predetermined frequency and are quantized at a predetermined bit number, are recorded directly in recording media as in a Compact Disc (CD) or in a Digital Audio Tape (DAT) but a signal component only is recorded after being subjected to a highly efficient coding processing.

Details of the DCC system etc. are described in "NIKKEI ELECTRONICS" No. 535 (Sep. 2, 1991), P.127–P141, "NIKKEI ELECTRONICS" No. 542 (Dec. 9, 1991), P.125–P. 168, and "RADIO GIJUTSU", December 1991, P.156–P. 161.

FIG. 4 is a block diagram schematically showing a DCC recording device for example.

An analog audio signal is converted to digital data Of, e.g., 16 bits at 48 KHz, by an analog-to-digital converter 41 and then divided into signal components of 32 frequency bands by a subband filter 42. Thus, data of 32 frequency bands$\times$12 samples from the subband filter 42 constitute a signal processing unit to be processed at a time. If the sampling frequency is 48 KHz, unit time for processing one signal (one frame) is $32\times12/48K=8$ msec.

The data from the subband filter 42 is supplied to a bit assignment data generation section 43, a mantissa data generation section 44 and an exponential data generation section 45. The bit assignment data generation section 43 performs assignment of bits ranging from 2 bits to 15 bits, for example, adapted to human hearing characteristics to plural data on the basis of signal patterns of 32 frequency bands. The exponential data generation section 45 quantizes a scale factor portion, which is the largest data in the 12 sampled data, of the output of the subband filter 42 at a predetermined number of bits, e.g., 6 bits, whereas the mantissa data generation section 44 quantizes a mantissa portion of the output of the subband filter 42 at a number of bits which has been assigned by the bit assignment data generation section 43.

These data are converted to data of the PASC (Precision Adaptive Subband Coding) format by a format generation section 46. The data of this format is shown in FIG. 5. Data of one frame (8 msec) consists of a synchronizing signal, bit assignment data, exponential data and mantissa data. Total data amount of one frame is constant but data of subbands existing in the audio range only are bit-assigned and the bit-assigned data only are stored in correspondence to bit numbers designated by the bit assignment data and, therefore, data amount of exponential data and data amount of mantissa data in each subband differ depending upon the subband and frame.

Audio data converted to the PASC format is imparted with a code for CIRC (cross interleave Read-Solomon code) correction by an error correction and encoding section 47 and is recorded on a recording medium after being subjected to 8 to 10 modulation.

Although total data amount of one frame is constant in this system, no data is recorded in either the exponential section or the mantissa section in a subband to which a number of bits has not been assigned. Even in a subband to which a number of bits has been assigned, the data amount of the mantissa section differs depending upon the subband and frame.

In this system, therefore, when an error has occurred in frame data during reproduction of data and this error cannot be corrected by the error correction means, correction cannot be made simply by employing a linear correction method as currently employed in the CD or DAT system. When, for example, an error has occurred in bit assignment data, all data of one frame becomes totally unidentifiable. This is because data position in one frame undergoes change in accordance with the bit assignment data. Therefore, when an error has occurred in the bit assignment data, all data of one frame must be copied from a preceding frame with resulting serious deterioration in a reproduced tone.

It is, therefore, an object of the invention to provide a method for correcting an error in digital data which is capable of preventing deterioration in reproduced tone even when an irremediable error has occurred in the digital data.

SUMMARY OF THE INVENTION

For achieving the above described object of the invention, a first method and a device for correcting an error in digital data according to the invention in which data of one frame consists of bit assignment data and plural data each consisting of data of a number of bits assigned by the bit assignment data comprises a step of substituting the plural data by noise data when an error has occurred in the bit assignment data.

A second method and a device according to the invention for correcting an error in digital data in which data of one frame consists of bit assignment data and plural data each consisting of exponential data assigned by the bit assignment data and mantissa data of a number of bits assigned by the bit assignment data, comprises a step of correcting the exponential data on the basis of preceding frame or on the basis of both preceding and subsequent frames and substituting the mantissa data by noise data when an error has occurred in the bit assignment data.

In these methods, the noise data may be band-limited noise such as pink noise.

According to the first method of the invention, when an error has occurred in the bit assignment data, plural data are substituted by noise data and, therefore, occurrence of information which cannot be generated between frames is prevented, though information cannot be interpolated completely between frames. Thus, generation of an extremely disturbing noise can be effectively prevented during reproduction of data. Therefore, according to the invention, even when an irremediable error has occurred in digital data, deterioration of a signal during reproduction can be prevented. Further, according to the invention, since data of preceding and subsequent frames need not be referred to, a memory capacity required for such reference can be saved.

According to the second method of the invention, exponential data which determines dynamic range is corrected on the basis of preceding data or on the basis of preceding and subsequent data and mantissa data is substituted by noise data and, therefore, continuity of the tone volume level is improved in addition to the above described result.

Preferred embodiments of the invention will be described below with reference to the accompanying drawings.

BRIEF DESCRIPTION OF THE DRAWINGS

In the accompanying drawings.

DESCRIPTION OF PREFERRED EMBODIMENTS

Figure 1:
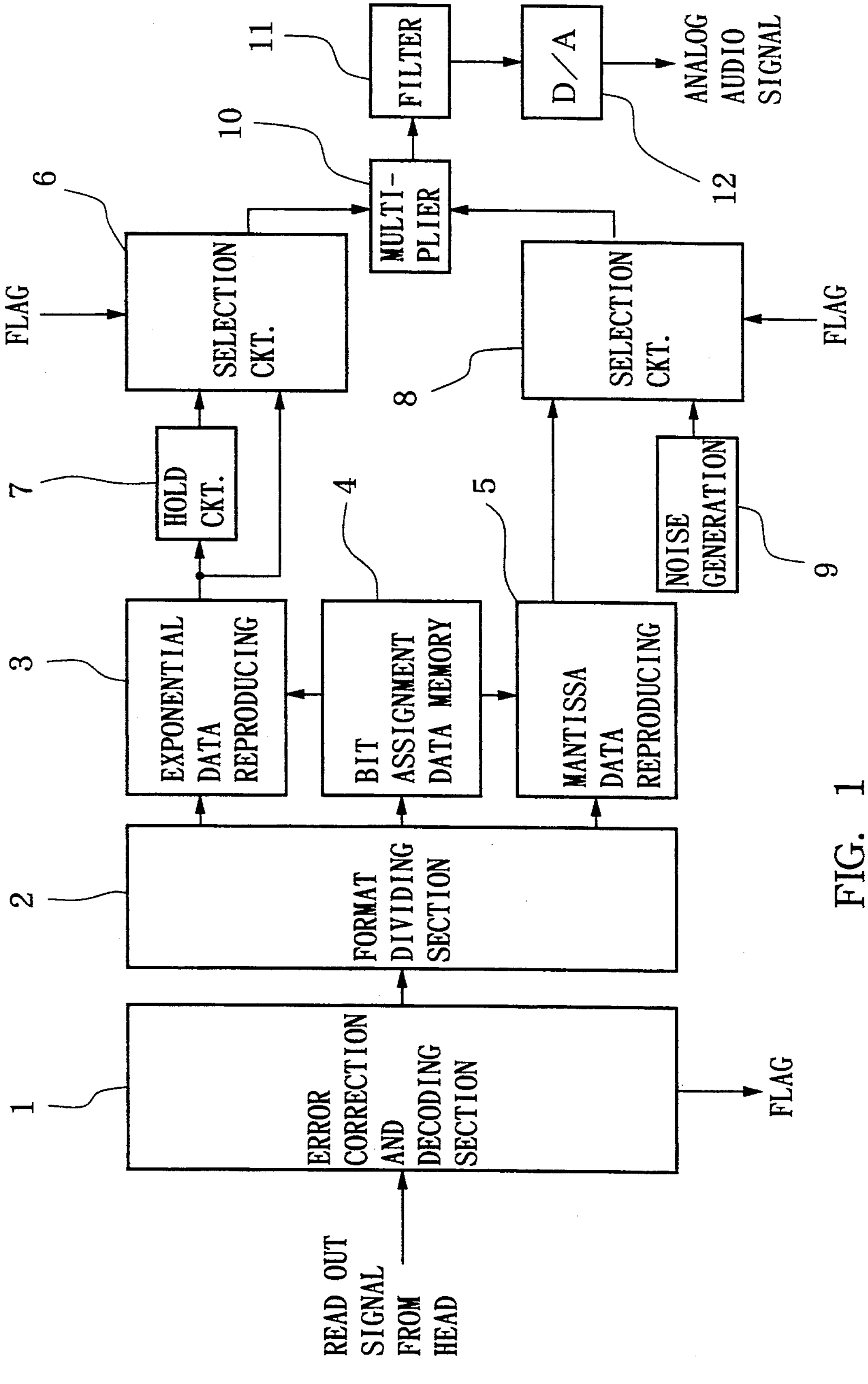
FIG. 1 is a block diagram showing a reproduction device carrying out a first embodiment of the error correction method according to the invention.

Referring to FIG. 1 showing the reproduction device carrying out the first embodiment of the invention, a signal which has been read from an unillustrated magnetic tape through an unillustrated magnetic head and has been waveshaped is demodulated to data of 8 bits by the 10 to 8 demodulation by an error correction and decoding section 1. The demodulated data is subjected to a CIRC error correction processing and thereafter is supplied to a format dividing section 2. The format dividing section 2 divides the data of the PASC format to bit assignment data, exponential data and mantissa data. The exponential data, bit assignment data and mantissa data are respectively supplied to an exponential data reproducing section 3, a bit assignment data memory 4 and a mantissa data reproducing section 5. The exponential data reproducing section 3 and the mantissa data reproducing section 5 respectively reproduce exponential data and mantissa data of each subband on the basis of bit assignment data stored in the bit assignment data memory 4.

The exponential data provided by the exponential data reproducing section 3 is supplied to one input terminal of a selection circuit 6 and a hold circuit 7 which holds exponential data of one frame. To the other input of the selection circuit 5 is supplied exponential data from the hold circuit 7 which has been delayed by one frame. The mantissa data provided from the mantissa data reproducing section 5 is supplied to one input terminal of a selection circuit 8. To the other input terminal of the selection circuit 8 is supplied random noise from a noise generation circuit 9.

The error correction and decoding section 1 also outputs a flag which becomes active, e.g., data "1" is output, when an error has occurred in the bit assignment data. This flag is supplied as a switching signal for switching the selection circuits 6 and 8. The selection circuits 6 and 8 respectively select the outputs of the hold circuit 7 and the noise generation circuit 9 when the flag is active.

The outputs of the selection circuits 6 and 8 are combined and converted from floating point data to fixed point data by a multiplier 10 and supplied through a filter 11 to a digital-to-analog converter 12 by which the data is reproduced as an analog audio signal.

According to this reproduction device, an error in the bit assignment data is detected by the error correction and decoding section 1 and, when this error is irremediable, the exponential data is substituted by data of a preceding frame and the mantissa data is substituted by a random noise. By this arrangement, the exponential data which determines the tone volume level is substituted by data of a preceding frame and, therefore, continuity in the tone volume is secured. Further, since the mantissa data is substituted by the random noise having a form of digital data, insertion of extreme data between frames is prevented and deterioration of a reproduced tone is thereby prevented.

Figure 2:
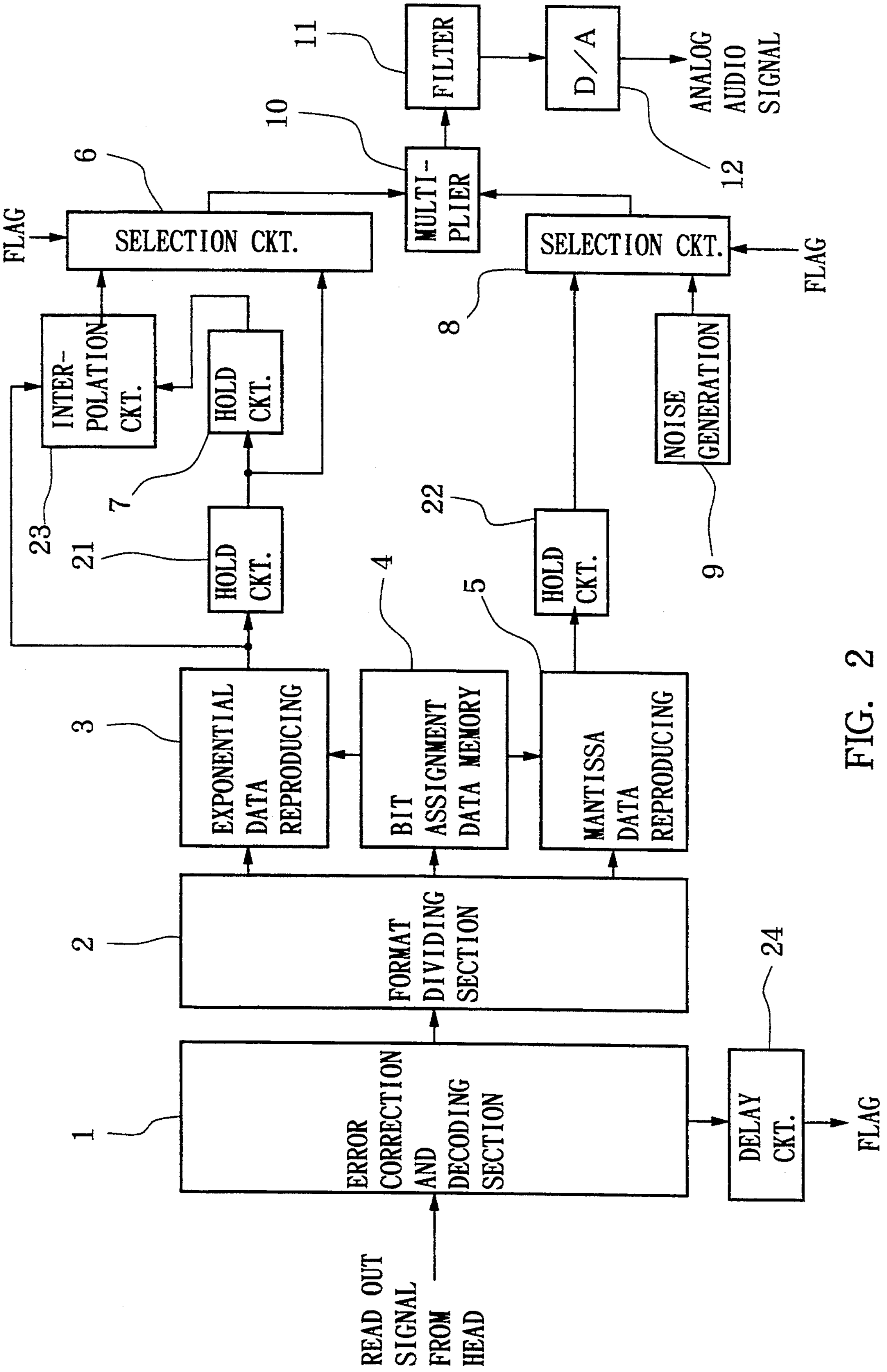
FIG. 2 is a block diagram showing a reproduction device carrying out a second embodiment of the error detection method according to the invention.

FIG. 2 shows a reproducing device carrying out the second embodiment of the invention. The same component parts in the device of FIG. 2 as those in the first embodiment (FIG. 1) are designated by the same reference characters and description thereof will be omitted.

In this device, hold circuits 21 and 22 are disposed in the posterior stage of the exponential data reproducing section 3 and the mantissa data reproducing section 5 of the device of FIG. 1. These hold circuits 21 and 22 respectively hold exponential data and mantissa data of one frame.

Outputs of the exponential data reproducing section 3 and the hold circuit 7 are supplied to an interpolation circuit 23. When the exponential data is irremediable, the interpolation circuit 23 interpolates the exponential data from the preceding and subsequent frames by employing a proper interpolation method such as the primary and secondary spline interpolation. The output of this interpolation circuit 23 is supplied to the other input terminal of the selection circuit 6.

The flag provided by the error correction and decoding section 1 is delayed by one frame by a delay circuit 24.

According to this device, when an error has occurred in the bit assignment data, the exponential data is interpolated on the basis of the preceding and subsequent frames and, therefore, continuity in the tone volume of a reproduced tone is further improved.

In the above described embodiments, when an error has occurred in the bit assignment data, the exponential data is substituted by data of a preceding frame or interpolated from preceding and subsequent frames. Alternatively, the exponential data may be substituted by noise data. In this case, the hold circuit 7 of FIG. 1 may be substituted by a noise generation source similar to the noise generation circuit 9.

Figure 3:
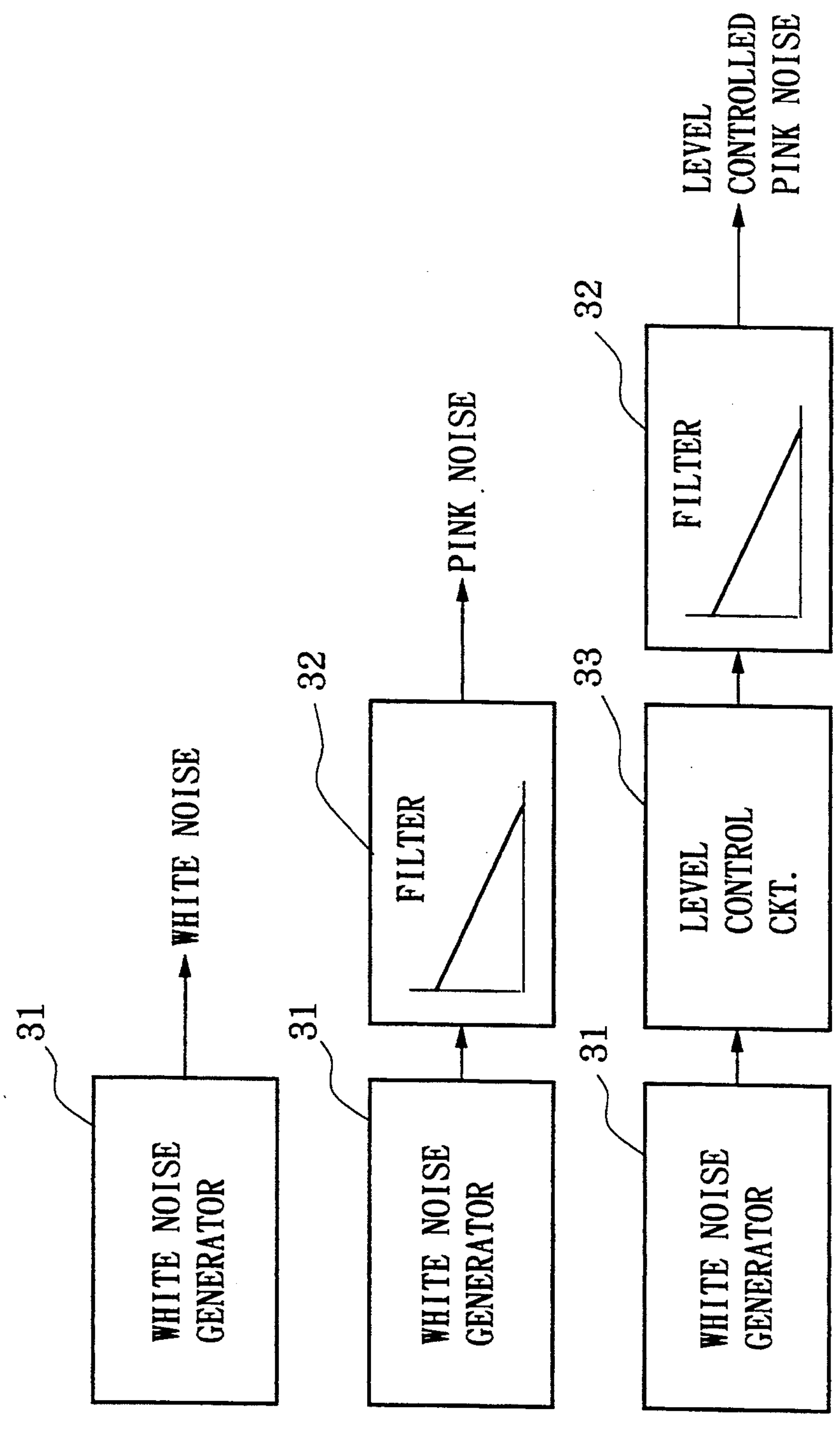
FIGS. 3(*a*) to 3(*c*) are block diagram showing specific examples of a noise generation circuit in these reproduction devices.
Figure 4:
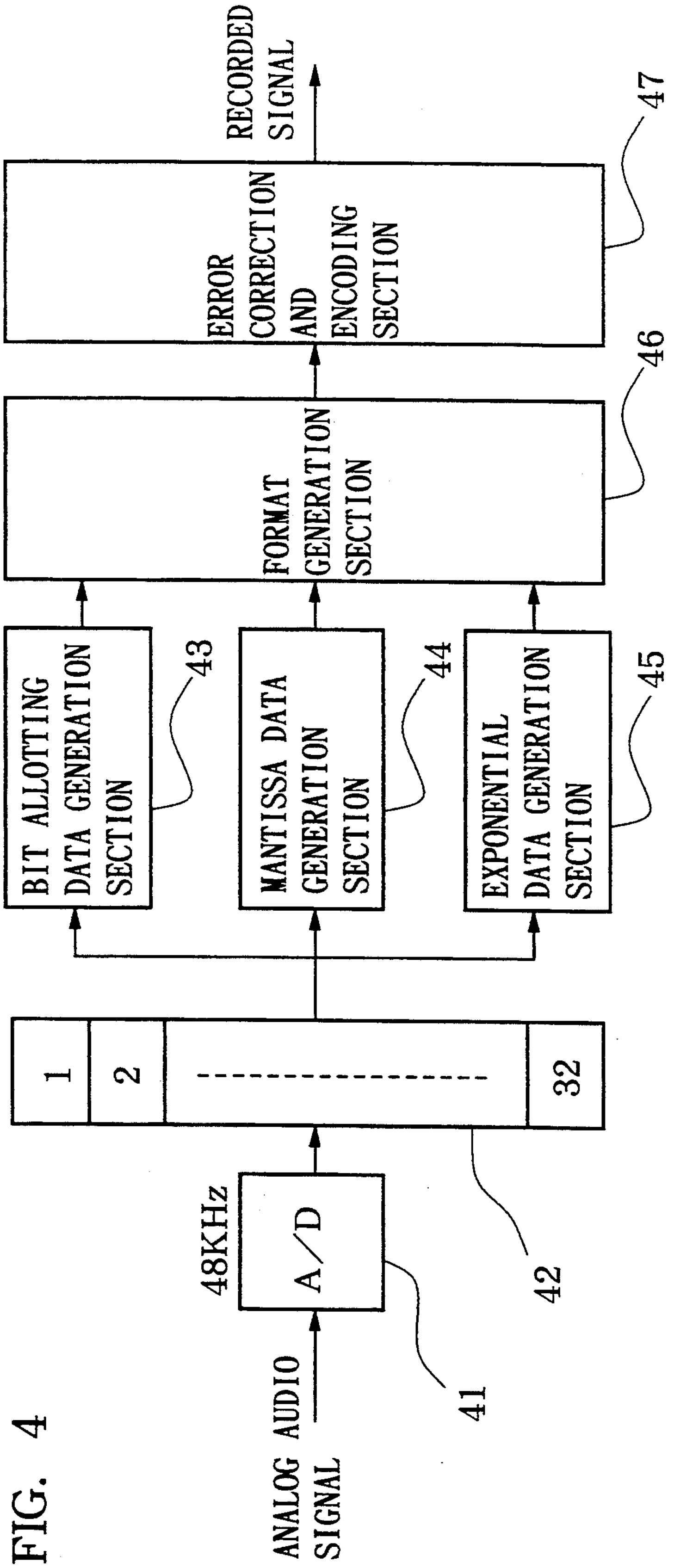
FIG. 4 is a block diagram schematically showing a DCC recording device.
Figure 5:
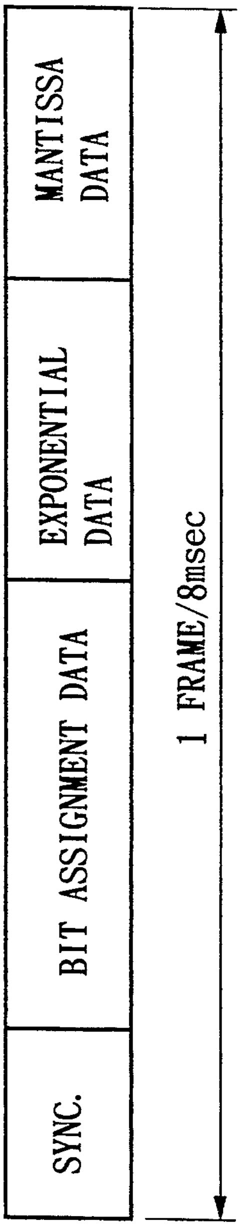
FIG. 5 is a diagram showing a format of digital data generated by the recording device of FIG. 4.

In these embodiments, circuits shown in FIGS. 3(*a*), 3(*b*) and 3(*c*) may be employed as the noise circuit.

FIG. 3(*a*) shows an example in which white noise generated by a white noise generator 31 is employed.

FIG. 3(*b*) shows an example in which pink noise is employed. The pink noise is obtained by band-limiting white noise generated by a white noise generator 31 with a filter 32 having an inclination characteristic. According to results of simulation made by the inventors of this invention, pink noise has brought about better results than white noise.

FIG. 3(*c*) shows an example in which white noise generated by a white noise generator 31 is level controlled by a level control circuit 33 and further level controlled by a filter 32 to produce pink noise and this pink noise is employed as the noise source. The level control circuit 33 performs a level control in such a manner that an average value of level of the same band in the preceding and subsequent frames is used as an average value (central value) of the noise. In this case, an additional hold circuit may be provided in the posterior stage of the hold circuit 22 of FIG. 2 and the level control may be performed on the basis of the output of this hold circuit and the output of the mantissa data reproducing section 5. The circuit of FIG. 3(*c*) has the advantage that continuity in frequency of a reproduced tone is improved.

What is claimed is:

1. An error correction device for high efficiency coded digital data, one frame of the high efficiency coded digital data including bit assignment data and a plurality of data, the plurality of data respectively having a predetermined number of bits respectively assigned by the bit assignment data, the error correction device comprising:

input means for receiving the high efficiency coded digital data;

error detection means for detecting an error of the bit assignment data of received coded digital data; and substitution means for substituting a plurality of data of the received coded digital data by noise data when an error of the bit assignment data is detected by said error detection means.

2. The error correction device as defined in claim 1 wherein said noise data is band-limited noise.

3. The error correction device as defined in claim 2 wherein said band-limited noise is level-controlled in such a manner that an average value of level of preceding and subsequent frames of the current frame is used as an average value of the noise.

4. The error correction device as defined in claim 1 wherein said plurality of data comprises mantissa data.

5. The error correction device as defined in claim 4 wherein said coded digital data further comprises exponential data, and the error correction device further comprises second substitution means for substituting exponential data of the received coded digital data by different exponential data of received coded digital data.

6. The error correction device as defined in claim 5 wherein the different exponential data is formed by interpolating exponential data of both preceding frame and subsequent frame.

7. The error correction device as defined in claim 5 wherein the different exponential data is of a preceding frame of received coded digital data.

8. The error correction device as defined in claim 4 wherein said noise data is band-limited noise.

9. The error correction device as defined in claim 1 wherein said plurality of data comprises exponential data and mantissa data.

10. The error correction device as defined in claim 9 wherein said noise data is band-limited noise.

11. The error correction device as defined in claim 1 wherein said noise data is white noise.

12. The error correction device as defined in claim 1 wherein said noise data is pink noise.

13. An error correction device for high efficiency coded digital data, one frame of the high efficiency coded digital data including bit assignment data and a plurality of data, the plurality of data respectively having a predetermined number of bits respectively assigned by the bit assignment data and comprising exponential data and mantissa data, the error correction device comprising:

an input for receiving the high efficiency coded digital data;

an error detector for detecting an error of the bit assignment data of received coded digital data;

a format dividing and reproducing device for reproducing bit assignment data, exponential data and mantissa data from received coded digital data; and a substitution device for substituting mantissa data of the received coded digital data by noise data when an error of the bit assignment data is detected by said error detector.

14. The error correction device as defined in claim 13 wherein said substitution device comprises a noise generator and a selector for selectively providing either an output of said format dividing and reproducing device or an output of said noise generator wherein said selector provides the output of said noise generator when said error detector detects the error of the bit assignment data.

15. The error correction device as defined in claim 14 further comprising a holding device for holding exponential data for one frame and a second selector for selectively providing either an output of said format dividing and reproducing device or an output of said holding device wherein said second selector provides said output of said holding device when said error detector detects the error of the bit assignment data.

16. A method for high efficiency coded digital data, one frame of the high efficiency coded digital data including bit assignment data and a plurality of data, the plurality of data respectively having a predetermined number of bits respectively assigned by the bit assignment data, the method comprising the steps of:

receiving high efficiency coded digital data, detecting an error of bit assignment data of received coded digital data, and substituting a plurality of data of the received coded digital data by noise data when an error of the bit assignment data is detected.

* * * * *